(12) United States Patent
Elliot et al.

(10) Patent No.: US 7,245,703 B2
(45) Date of Patent: Jul. 17, 2007

(54) ALARM SIGNAL INTERCEPTOR, MIDDLEWARE PROCESSOR, AND RE-TRANSMITTER USING CALLER ID

(76) Inventors: Harvey Alexander Elliot, 1419 Park Dr., Ojai, CA (US) 83023; Bryan Field-Elliot, 2272 Holyoke Dr., Boulder, CO (US) 80305

( * ) Notice: Subject to any disclaimer, the term of this patent is extended or adjusted under 35 U.S.C. 154(b) by 685 days.

(21) Appl. No.: 10/462,708

(22) Filed: Jun. 17, 2003

(65) Prior Publication Data

US 2004/0047458 A1   Mar. 11, 2004

Related U.S. Application Data

(60) Provisional application No. 60/389,960, filed on Jun. 20, 2002.

(51) Int. Cl.
*H04M 11/04* (2006.01)
(52) U.S. Cl. ............... 379/37; 379/45; 379/48; 340/506
(58) Field of Classification Search ............ 379/37, 379/38, 39, 40–45, 48, 49; 340/506, 31, 340/521, 531, 535
See application file for complete search history.

(56) References Cited

U.S. PATENT DOCUMENTS

| | | | |
|---|---|---|---|
| 5,134,644 A | 7/1992 | Garton et al. | 379/39 |
| 5,365,568 A | 11/1994 | Gilbert | 379/43 |
| 5,796,633 A * | 8/1998 | Burgess et al. | 702/187 |
| 5,923,731 A | 7/1999 | McClure | 379/33 |
| 6,075,451 A * | 6/2000 | Lebowitz et al. | 340/539.19 |
| 6,272,212 B1 | 8/2001 | Wulforst et al. | 379/199 |
| 6,311,072 B1 | 10/2001 | Barclay et al. | 455/552 |
| 6,381,307 B1 * | 4/2002 | Jeffers et al. | 379/142.01 |
| 6,452,490 B1 * | 9/2002 | Garland et al. | 340/506 |
| 6,493,435 B1 | 12/2002 | Petricoin | 379/93.05 |
| 6,603,845 B2 | 8/2003 | Jensen et al. | 379/142.01 |
| 6,829,478 B1 * | 12/2004 | Layton et al. | 455/428 |
| 2003/0128115 A1 | 7/2003 | Giacopelli et al. | 340/506 |

\* cited by examiner

*Primary Examiner*—Melur Ramakrishnaiah
(74) *Attorney, Agent, or Firm*—Robert Platt Bell

(57) ABSTRACT

A relatively simple redialer device is provided at the customer's home to redirect outgoing alarm calls to a middleware processing center. The redialer first dials "★82" (or other appropriate code) to disable caller-ID blocking. The redialer then redirects the alarm call to a middleware processing center. The middleware processing center receives the alarm call and determines the customer identification by detecting the caller ID. The middleware processing center then dials out to the appropriate alarm company for that customer, and transfers the alarm data along with customer identification information (account number or the like) in a data format compatible with the alarm monitoring company's computers. The alarm is then handled by the alarm monitoring company in the normal manner practiced by the alarm monitoring company.

30 Claims, 2 Drawing Sheets

ALARM SIGNAL INTERCEPTOR, MIDDLEWARE PROCESSOR, AND RE-TRANSMITTER USING CALLER ID

CROSS-REFERENCE TO RELATED APPLICATIONS

The present application claims priority from Provisional U.S. Patent Application Ser. No. 60/389,960 filed on Jun. 20, 2002, and incorporated herein by reference in its entirety.

FIELD OF THE INVENTION

The present invention relates to alarm systems. In particular, the present invention is directed toward an apparatus and system for redirecting alarm calls, particularly to a middleware system, identifying the source of the alarm call by caller ID, attaching an account number or name to the alarm call, and forwarding the call to an alarm monitoring station. The present invention is also directed towards ancillary services (e.g., e-mail or pager notification) provided by such a middle-ware system.

BACKGROUND OF THE INVENTION

Alarm systems are well known in the art for use with homes or businesses. In a typical business or home alarm, a number of sensors may be provided to detect various conditions. Examples of these sensors include door and window sensors, motion sensors, glass break detectors, heat and fire sensors, flood sensors and sprinkler system pressure sensors. When one of these sensors is activated (e.g., burglary or fire occurs, or false alarm) the sensor communicates with a control panel.

The control panel, typically microprocessor controlled, may receive sensor signals, as well as signals from sensors indicating sensor tampering, battery status, and sensor maintenance status. From a predetermined program, the microprocessor may determine whether an alarm should be sounded (e.g., Police or Fire), sound the appropriate alarm, and telephone an alarm company to indicate an alarm condition exists.

Most radio frequency (RF) wireless security systems available today, such as those manufactured by Alarm Manufacturing Device Co. (ADEMCO) 165 Eileen Way, Syosset, N.Y. 11791, employ a multiplicity of transmitters in communication with a central receiver control unit. The information transmitted typically describes the state of various transducers or sensors associated with each transmitter, such as smoke, motion, breaking glass, shock and vibration detectors, door, window and floor mat switches, and the like. These transmitters are designed to be inexpensive to manufacture.

Most of these alarm systems are manufactured by a few main alarm system manufacturers. As such, such standardized equipment is relatively inexpensive to purchase, maintain, repair and replace. However, some major alarm companies which do large volumes of nationwide business have purchased from these major alarm manufacturers, specialized or "proprietary" versions of these standardized alarm systems.

The reasons for modifying the standardized alarm system are many. For some large alarm companies, the alarm equipment is leased to the consumer, and the alarm company does not want the equipment to be readily used by others. In other instances, where the alarm equipment is sold to the consumer, the use of a "proprietary" version of the alarm system makes it more difficult for the consumer to switch to different alarm monitoring companies.

It should be noted that the term "proprietary" as used here (and as is used in the alarm industry) does not necessarily imply that these modified alarm systems employ any protected intellectual property (e.g., Patents, Copyrights, trade secrets) above and beyond the underlying standard alarm system technology. Rather, the changes to the system to make it "proprietary" relate more to changing the coding used to report alarms, pre-programming of telephone numbers and the like (e.g., 1-800 number to report alarms) and coding used to communicate from the alarm monitoring company to the alarm system (for maintenance and the like).

By slightly altering this coding (e.g., via PROM chip within the control panel or the like) the alarm company has made it much more difficult for a third party alarm monitoring company to monitor the alarm system. Extensive re-programming may be required by a service technician at the site to reprogram the alarm dial-up numbers and alarm codes to conform to the third party alarm monitoring companies numbers and codes.

Such reprogramming may require temporary installation of a programming control panel, as typical consumer control panels may not provide sufficient feedback for programming purposes (e.g., limited display capabilities). Moreover, such programming requires the skills and experience of a knowledgeable technician in the field. Such knowledgeable technicians are hard to come by, expensive to train, and difficult to retain. Improper programming can result in all alarm system settings being lost and even the system being locked out, requiring extensive manual re-programming and "learning" by activating each sensor in the system.

Moreover, the hourly rate of a skilled alarm technician is higher than a standard alarm technician. Thus, if a third party alarm company wants to "convert" a customer (with proprietary equipment) from a major alarm company, considerable cost must be incurred to re-program the consumer's alarm system. As a third party alarm monitoring company may be competing on price, this re-programming adds cost to the alarm company's bottom line, making them less competitive, which is exactly the reason the major alarm companies use proprietary systems in the first place—to keep customers captive.

Moreover, in some instances, it may not be possible at all to reprogram the alarm system. The alarm system may be so modified (or indeed, custom made for the major alarm company) that it cannot be reprogrammed for use with any other alarm company. In such a scenario, the third party alarm company would have to install a whole new alarm system (or at least a new control panel) which may not be cost-effective.

Without competition in the marketplace, the consumer may find themselves in a difficult situation—stuck with an expensive alarm system that would be prohibitive in cost to replace, and stuck with an alarm monitoring company that may be providing inadequate service at whatever prices it chooses to dictate.

A solution which would allow for greater consumer choice would improve competition in the marketplace. Such a solution should be easy to install, inexpensive, and not require the services of a skilled alarm technician.

It can be appreciated that digital data communicators have been in use for years. However, a digital translator for an alarm system is not known to exist. The main problem with digital communicators is that they require a considerable amount of time to be installed by a skilled technician. Another problem is that a digital alarm communicator system manufactured in the past may not have the ability to accept new dialing patterns or other changes as required by the communications industry (e.g., move to 10-digit phone numbers or the like).

Another problem with a digital alarm communicator system manufactured in the past may be the requirement that communication only occur with a digital alarm communicator receiver that was manufactured by a specific company. Thus, for example, if an alarm monitoring company wishes to monitor a number of different customers who use different brands of equipment, the alarm company may need to purchase separate central station monitoring equipment for each brand of alarm monitored.

This central station monitoring equipment (i.e., equipment at the alarm company monitoring headquarters) can be fairly expensive to purchase. Moreover, the use of different brands of monitoring equipment requires having the skills to repair and maintain the different brands of central station monitoring equipment. Alarm monitoring personnel may need to be trained on different types of equipment and monitor different equipment simultaneously. In addition, since each system may be separate, it may be difficult to provide a single display or interface to the alarm monitor personnel or to record or log alarms in a single central system.

Another problem with a digital alarm communicator system is that some manufacturers of digital alarm communicator systems have ceased supporting the dialers or other hardware or have gone out of business—consequently leaving the consumer with no choice but to replace installed equipment with new equipment. Another problem with existing products is that the original installing company may have gone out of business, depriving the new provider of essential information necessary to reprogram the existing system.

Digital data translators per se, are known in the art. For example, Barclay, U.S. Pat. No. 6,311,072, issued Oct. 30, 2001 and incorporated herein by reference, discloses an apparatus for translating between telephone signalling protocols. However, this system, assigned to Lucent Technologies, appears to be designed more for interfacing complete telephone systems together, rather than interfacing between two devices on the same phone system.

Thus, the apparatus of Barclay is a fairly complex device (e.g., using Sun Sparc workstations) designed for a specific type of interface between two phone systems. In contrast, in the Alarm industry, there is a need to interface existing alarm systems of many different types to a receiver system at a very low installed cost. A complex interface network such as in Barclay (assuming arguendo such a system would even be applicable) would be too specialized and costly to use.

Wulforst et al. U.S. Pat. No. 6,272,212, issued Aug. 7, 2001, and incorporated herein by reference, discloses a telephone intercept apparatus. The apparatus monitors outgoing telephone numbers and disconnects the telecommunications equipment from the telephone company network and redirects the call to a different number.

Such simple redialers merely redirect a call to a different telephone number. While such a device may have some utility, additional data may need to be translated in order for an alarm system to be successfully redirected to a new alarm monitoring company.

Third party alarm monitoring companies may be interested in obtaining customers ("conversions") provided by other alarm companies. However, such third party alarm monitoring companies may not be interested in investing in the technology and hardware necessary to translate data from other types of alarm systems to conform with their own equipment. Moreover, customer account numbers and other data from converted customers may conflict or duplicate data from existing customers.

In addition, alarm monitoring companies may wish to implement additional extra-cost services to enhance revenue streams and provide additional alarm utility for clients. However again, such alarm monitoring companies may not wish to invest in the equipment necessary for such additional services. Moreover, third parties may wish to offer these services without forcing the customer to change alarm monitoring companies.

It may be possible to provide such hardware as a call-intercept device in the customer's home. However, with each additional data conversion or additional service, the complexity of such a home telephone intercept device increases. In order to keep costs down, the nature of a telephone intercept device may need to be kept simple.

Thus, a need exists in the art for an apparatus and system which allows for data from converted alarm customers to be translated, modified, or enhanced without significantly altering the alarm equipment at the alarm monitoring company or without providing an unduly complex home intercept device.

SUMMARY OF THE INVENTION

The present invention solves the aforementioned problems by providing a middleware solution. A relatively simple redialer device is provided at the customer's home to redirect outgoing alarm calls to a middleware processing center. This redialer is provided with a unique feature in that is first dials "★82" (or other appropriate code) to disable caller-ID blocking. The redialer then redirects the alarm call to a middleware processing center.

The middleware processing center receives the alarm call and determines the customer identification by detecting the caller ID, using standard caller ID telephone techniques. Each customer typically would have a unique telephone number (or numbers) from which their alarm system would be calling, and thus the caller ID number should uniquely identify the customer.

The middleware processing center then dials out to the appropriate alarm company for that customer, and transfers the alarm data along with customer identification information (account number or the like) in a data format compatible with the alarm monitoring company's computers. The alarm is then handled by the alarm monitoring company in the normal manner practiced by the alarm monitoring company.

Of course, the middleware processor may also be physically located in the same (or nearby) facility as the alarm company. In such an embodiment, communication between the middleware processor and the alarm company may take place over a standard alarm receiver transmission media such as a serial port interface (e.g., RS-232) or local area network (LAN) interface or other type of interface.

The entire process is transparent to the alarm monitoring company, which may not even be aware that the alarm signal has passed through the middleware processor. This system may make it easier for a customer to switch alarm companies at will, as the reprogramming of the alarm is unnecessary, nor is the installation of a new telephone intercept device required with each switch. The middleware processing center can switch the customer to a new alarm company simply be redirecting calls from the middleware processing center.

The system also allows the middleware processing center to offer alarm services to customers without being tied to one alarm monitoring company. If the alarm monitoring company raises rates, for example, the middleware processing center can switch its customers to a new alarm monitoring company instantly and seamlessly, without having to reprogram individual alarm systems or installing new alarm intercept devices.

This feature may be particularly desirable, as in the industry, the market is generally segmented into alarm system installers, providers, and monitoring services. Thus a provider may be the "front end" interface to the customer while the alarm monitoring company may do the actual monitoring. The task of monitoring, which is labor intensive, may be performed by staff in a remote location where labor rates are lowest.

The present invention also allows additional services not provided by the alarm monitoring company to be added to an alarm system without reprogramming individual alarm systems, installing new alarm equipment in the home or business, and without altering the alarm monitoring hardware at the alarm monitoring company.

The middleware system of the present invention, for example, may be programmed to call a customer with a voice announcement when an alarm is activated. Thus, a customer may receive a cell-phone (or other type) of call with a voice message "your alarm has been set off" or the like, when an alarm occurs. Similarly, text messages may be sent to cell phones, pagers, and the like, including but not limited to, so-called 3G cell phones, Blackberry™ type portable e-mail systems and other communications devices, as well as conventional e-mails and the like. In this manner, a customer can be made aware in real time of an alarm and take preventive action, particularly in the case of false alarms.

As many alarm systems may be programmed to report other parameters, such a middleware solution may be used to report other events. For example, some alarm systems dial out to report each deactivation and activation of the alarm, along with the user code of the individual activating or deactivating the alarm. A customer may request that this information be forwarded to him via e-mail, pager, cell-phone, or the like in order to monitor the comings and goings of individuals in an individual property.

As another example, flood sensors may be used to detect flooding of a property. In restaurant and other applications, temperature sensors may detect temperature conditions in freezers and refrigeration units. Such data can be reported to a user in order to prevent property loss in the event of a flood or loss of refrigeration. As can be imagined, the applications for such a middleware system are almost endless.

DETAILED DESCRIPTION OF THE INVENTION

Figure 1:
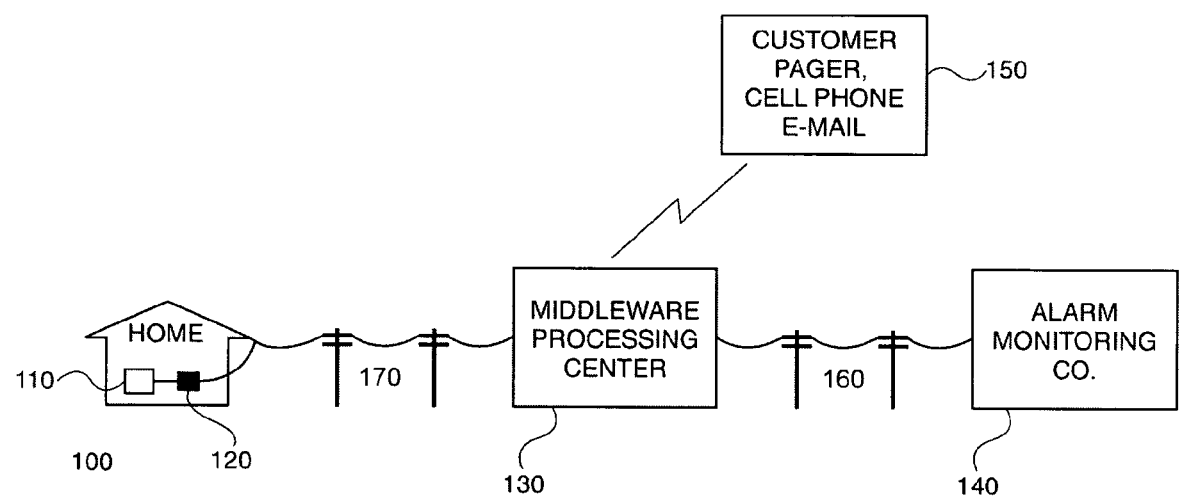
FIG. 1 is a block diagram of a first embodiment of the present invention.

Referring now to FIG. 1, a home 100 is illustrated provided with an alarm system 110. For the purposes of illustration, home 100 is illustrated as a residence. However, home 100 may represent any alarmed structure or device, including but not limited to, businesses, factories, stores, and the like, as well as boats, cars, airplanes, and the like.

Alarm system 110 may comprise any one of a number of known alarm systems used in the art or contemplated in the future. Such alarm systems are characterized in that they usually comprise at lease one sensor device (door or window switch, motion detector, glass break sensor, fire sensor, or the like), a control panel usually including a microprocessor, and a communications device for dialing out to an alarm monitoring station to report alarms as well as device status, activation, deactivation, and the like.

Telephone redialer 120 may be coupled to alarm system 110. Telephone redialer 120 may intercepts calls from alarm system 110 and redirects such calls to middleware processing center 130 via communication link 170 (e.g., telephone, radiotelephone, cell, or digital cell communication).

One unique feature of redialer 120 is that it first dials a "★82" (or other appropriate code) to unblock caller ID blocking, if such blocking has been enabled by the customer. Note that if the alarm system 110 can be reprogrammed to call the middleware processor, or if the alarm system is initially programmed to call the middleware processor, then telephone redialer 120 may not be required.

Note also, that although disclosed in the environment of using telephone lines 170 to communicate between the alarm system 110, middleware processor 130, and alarm monitoring company 140, other types of communication may be used are all within the spirit and scope of the present invention.

For example, if a home is connected to a DSL (ADSL), cable modem, or other type of Internet connection, the alarm system 110 may generate and transmit an alarm signal over such a network via an e-mail or instant messenger (IM) signal or the like, such that middleware processor 130 receives such a signal. In this manner, the alarm system 110 operates more as an "internet appliance" than as a dial-out modem type device. Thus telephone lines 170 illustrated in FIG. 1 should be interpreted as any of the communication means discussed herein.

Similarly, other types of communication means 160 may be used to communicate between middleware processor 130 and alarm company 140. Thus, other types of communications systems may be utilized in place of the phone lines 160 illustrated in FIG. 1, including but not limited to, wireless networks, cellular and digital wireless telephony, local area networks (LANs), local computer communications (e.g., RS-232 or the like). Thus, the telephone lines 160 should be interpreted as any of the communication means discussed herein and not be limited to hard-wired telephone lines.

If present, telephone redialer 120 may redial based upon the phone number input to redialer 120, or may simply redirect all outgoing calls from alarm 110 to middleware processing center 130, via communications link 160, depending upon how alarm system 110 is wired to the telephone system. In many applications, a home alarm 110 may be placed in the line between the TELCO system and the customer's handsets. As a result, every call placed by a customer may go through alarm system 110. By recognizing alarm system calls, redialer 120 may recognize which calls should be redirected to middleware processing center 130.

Middleware processing center 130 may comprise a number of modems, alarm signal receivers, or the like for receiving incoming telephone calls, a computer or computers networked together, for processing incoming calls. Middleware processing center identifies the source of an incoming call based upon the customer's caller-ID number. Alarm data is then translated into a format acceptable to alarm monitoring company 140, including a customer account or identification number correlated from the customer's caller-ID number, and transmitted to alarm monitoring company 140.

In the APPENDIX of Provisional U.S. Patent Application Ser. No. 60/389,960 filed on Jun. 20, 2002, is the source code for the working prototype of middleware system 130 in the best mode contemplated at the time of filing of the present application. Such software, running on a standard computer system, will redirect alarm calls and attach identification information based upon caller-ID data in the manner set forth in the present invention. In addition, in the APPENDIX of the present application is an additional source code which describes how a signal transmitter may send the alarm signal over a local RS-232 interface to an alarm monitoring station's computers.

Note that for the purposes of this application, "alarm data" include not only signals indicating an alarm, but also information which may be sent by an alarm system, including but not limited to activation and deactivation events, regular system status checks, system status alarms (low battery, tamper) and the like.

To alarm monitoring company 140, it appears only that a typical alarm signal has been received. Alarm monitoring company 140 may then process the signal according to its own internal policies (e.g., dispatching fire or police services, calling the customer, or the like).

In this manner, a customer at home 100 may subscribe to a different alarm monitoring company 140 than the one, for example, that originally installed the alarm, without having to install more than a redialer or reprogramming the alarm system to dial the middleware provider. Once connected to the middleware provider, the subscriber can change monitoring companies at will without further reprogramming of the alarm system and/or without having to install a new redialer. Moreover, the middleware provider may be able to shop around for the lowest cost monitoring solutions and switch the customer to an alternate monitoring station at will. Thus, for example, low cost off-shore alarm monitoring personnel may be used in a manner transparent to the customer.

In addition, the present invention, by using a middleware solution, opens up entire new avenue for ancillary alarm services and products. For example, as illustrated in FIG. 1, a signal may be sent to a customer pager, cellphone, e-mail, land-line or the like 150 indicating that an alarm event has occurred. Middleware processing center 130 may be programmed to retransmit only those alarm signals of interest to a customer (fire, burglary, or the like) rather than all signals including status checks.

In addition, middleware processing center 130 can translate such alarm data into English (or other human language) messages which can be readily understood by the user. Middleware processing center may also be programmed to receive responses from the user to terminate the alarm. Thus, for example, if a user accidently sets off his own alarm, he may receive a text or voice message on his 2-way pager or cell-phone (or other electronic device) indicating an alarm has been activated and requesting a reply (e.g., "CANCEL Y/N?).

The user may simply hit "N", possibly followed by an activation code or password, to cancel the alarm. Middleware processing center 130 may then simply squelch the alarm and not forward it to the alarm monitoring company 140.

Figure 2:
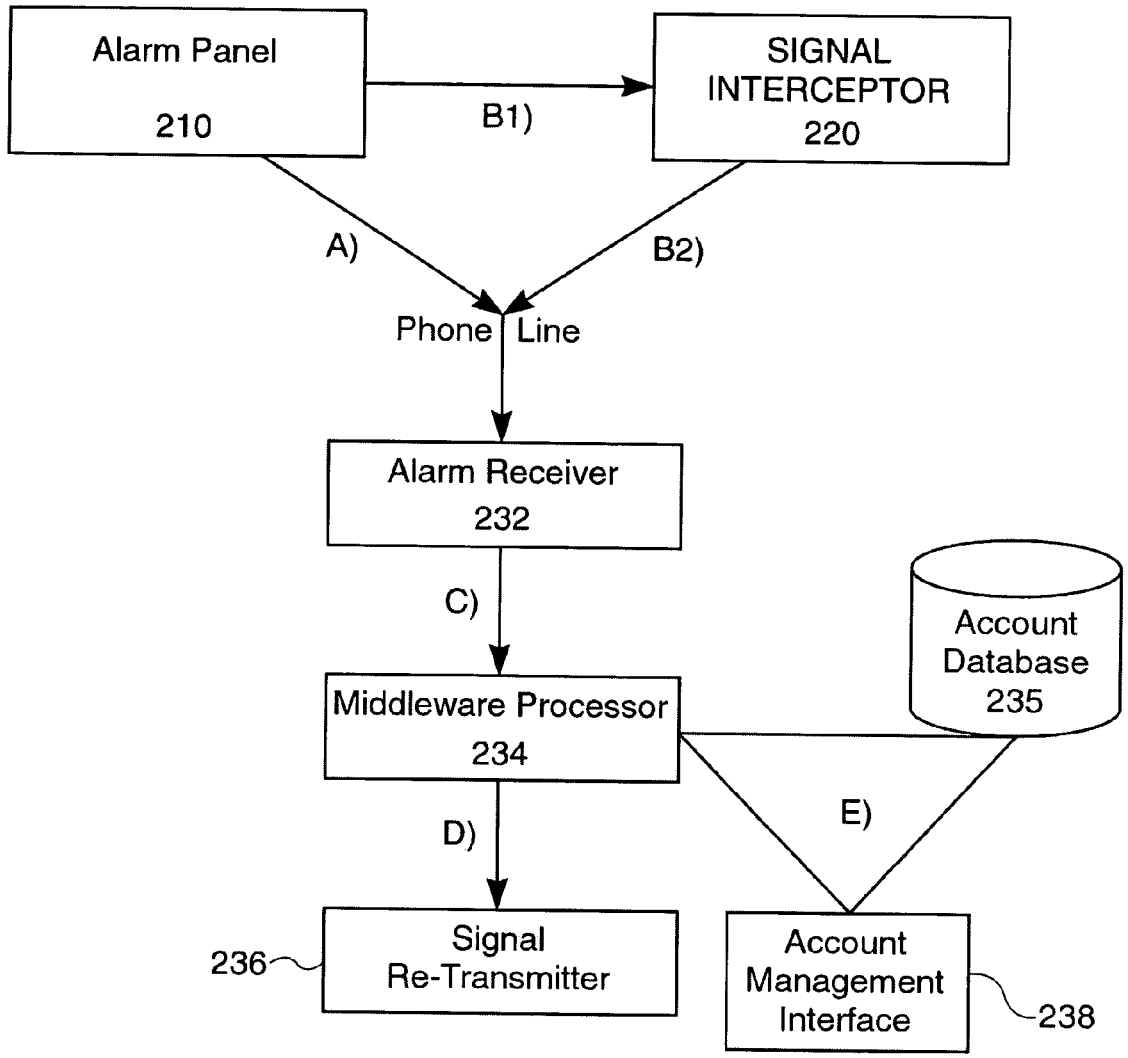
FIG. 2 is another block diagram illustrating the present invention in more detail.

FIG. 2 is another block diagram illustrating the present invention in more detail. Alarm Panel 210 may comprise an off-the-shelf alarm panel installed at the customer premises (home, office, or otherwise) capable of transmitting alarm signals in a standard format to a preprogrammed phone number. Signal Interceptor 220 may comprise a box of the present invention, installed at the customer premises between the control panel and the external phone line. Signal interceptor 220 intercepts outgoing calls, and redirects them to a different phone number (programmed within the box), before connecting the call through to the Alarm Panel.

Alarm Receiver 232 may comprise an off-the-shelf alarm receiver which accepts alarm signals and transmits them to an automation system, including the original signal as well as Caller-ID information. Middleware Processor 234 may comprise a computer system of the present invention which accepts alarm signals from an Alarm Receiver (including Caller-ID information). Upon receiving alarm information, Middleware Processor 234 may look up the account information in a database (using criteria such as Caller-ID information, receiver phone line, or alarm signal account number).

From the information contained in the Account Database 235, Middleware Processor 234 may carry out retransmission instructions contained therein. One possible retransmission instruction might be to dial another central station and retransmit the alarm signal (in its original form, or in a translated form such as altering the account number). Other retransmission instructions might include the sending of an E-Mail message, Fax, RPC (Remote Procedure Call), or other alert.

Account Database 235 may comprise a computerized database of the present invention, containing data of alarm accounts, including the phone number to which the Alarm Panel or Signal Interceptor is connected (used for Caller-ID account lookups), and any translation or retransmission instructions which the Middleware Processor must perform upon receiving a signal.

Signal Re-Transmitter 236 may comprise a computerized alarm signal delivery system of the present invention, which may carry out the instructions of the Middleware Processor when so directed. Alarm signals may be re-transmitted as new alarm signals, in which case the Re-Transmitter dials a phone number and impersonates the original Alarm Panel (possibly with an altered alarm signal message, such as a different account number or different zone information). The Re-transmitter can also transmit an alarm signal using other formats and mediums, such as E-Mail, Fax, or RPC or transmission to a monitoring station's internal automation system using RS 232 or Local Area Network (LAN) or the like.

Account Management Interface 238 may comprise a computer program used by account managers to maintain Alarm Account information in the Account Database. Account information may include the original phone number of the Alarm Panel or Signal Interceptor, as well as additional translation and re-transmission instructions.

While the preferred embodiment and various alternative embodiments of the invention have been disclosed and described in detail herein, it may be apparent to those skilled in the art that various changes in form and detail may be made therein without departing from the spirit and scope thereof.

For example, while disclosed in the context of alarm system technology, the present invention can be used for other types of autodialer equipment, such as "smart home" monitoring equipment and the like. Thus, a user may be able to centralize a number of autodialer functions to a single middleware provider which can then redirect such data to appropriate destinations.

In another variant, a customer's Alarm Panel may be connected directly to a telephone line, and may be programmed to dial the Alarm Receiver which is connected to the Middleware Processor. In this variant, no Signal Interceptor is required.

In another variant, a customer's Alarm Panel may be connected first to a Signal Interceptor (B1), and then to a telephone line (B2). In this variant, the Alarm Panel may have been programmed to dial the wrong telephone number (e.g., former alarm company), and may be prohibitively expensive or impossible to reprogram. Thus, the Signal Interceptor will redirect the telephone call to the correct Alarm Receiver, to be handled by a Middleware Processor.

In another variant, the Alarm Receiver may be incapable of decoding Caller-ID information, and transmits only the original alarm signal information to the Middleware Processor. In this variant, the Middleware Processor is able to perform account lookups using alarm receiver phone line identifiers, and alarm signal account numbers.

In another variant, the Alarm Receiver may decode Caller-ID information and transmits this information, along with the original alarm signal, to the Middleware Processor. In this variant, the Middleware Processor is able to perform account lookups using Caller-ID information as well as alarm receiver phone line identifiers and alarm signal account numbers.

In another variant, the Middleware Processor may instruct the Signal Re-Transmitter to dial another Alarm Receiver (such as one located at an Alarm Monitoring Station) and impersonate the original Alarm Panel, sending the original alarm signal.

In another variant, the Middleware Processor may instruct the Signal Re-Transmitter to dial another Alarm Receiver (such as one located at an Alarm Monitoring Station), and impersonate the original Alarm Panel, sending an alarm signal with a translated message. This message might have the account number, zones, or other signal information altered from its original contents, as specified by the translation instructions contained within the Account Database.

In another variant, the Middleware Processor may instruct the Signal Re-Transmitter to dial two or more other Alarm Receivers and transmit the alarm signal, in original or in translated form, as detailed in variants listed above.

In another variant, the Middleware Processor may instruct the Signal Re-Transmitter to send an electronic mail (E-Mail) message containing the alarm signal information to an E-Mail address specified in the Account Database.

In another variant, the Middleware Processor may instruct the Signal Re-Transmitter to send an electronic Fax document containing the alarm signal information to a Fax phone number specified in the Account Database.

In another variant, the Middleware Processor may instruct the Signal Re-Transmitter to send an electronic page containing the alarm signal information to a pager phone number or address specified in the Account Database.

In another variant, the Middleware Processor may instruct the Signal Re-Transmitter to send a voice message containing the alarm signal information to a phone number specified in the Account Database.

In another variant, the Middleware Processor may instruct the Signal Re-Transmitter to send a Remote Procedure Call (RPC) to another computer. A Remote Procedure Call is a computer to computer message indicating some event has occurred, or some action should be taken. The network across which communication takes place can be an internal network (LAN) within a company, or it can be across the public Internet. The format of the message is typically one of several popular RPC formats, including: SOAP, XML-RPC, Java RMI, DCOM, or CORBA. The present invention is capable of accepting an Alarm Signal, generating an RPC message, and transmitting the message to another computer address, using an RPC format and destination computer address specified in the Account Database.

In another variant, the Middleware Processor may instruct the Signal Re-Transmitter to send a Remote Procedure Call (RPC) to another computer on the local network, or on the Internet.

In another variant, the Account Management Interface may allow the administrative staff of the System to manage account information for all of it's customers using a graphical (GUI) or browser-based interface.

In another variant, the Account Management Interface may allow alarm system dealers to manage account information for their own accounts using a graphical (GUI) or browser-based interface. In this variant, the Account Database stores information about each dealer as well as each individual customer account, including which customer accounts belong to which dealers. Dealers are only allowed to administer the customer accounts which belong to them, and can specify phone number information, translation instructions, and re-transmission instructions for each account.

In another variant, the Account Management Interface may allow individual customers to manage their own account, including phone number information, translation instructions, and re-transmission instructions.

In another variant, the middleware processor may not retransmit the alarm signal at all, but may simply record it in a account database, for later reporting and reviewing by the alarm company, or by the customer. In this embodiment, the middleware processor may be viewed as the endware. Such an embodiment may be useful where a user wishes to log access to a building or computer system or the like.

In another variant of the present invention, the middleware processor may be programmed to receive alarm signals in the form of a Remote Procedure Call (RPC) rather than in the form of a telephone-transmitted alarm panel signal. In this embodiment, the middleware processor may accept the RPC message from a remote computer and process it as if it were an original panel signal and send it to the signal re-transmitter in the same way as the other variants.

Thus, for example, a computer system or network may generate alarm signals for transmission as RPC messages over a computer network or the like. Such alarm messages may indicate the activation of an alarm system coupled to the network or computer, or may indicate an unauthorized user is attempting to access the computer or network. Thus, a computer system or network can be monitored remotely even when no one is physically present at the location of the computer or network.

We claim:

1. A method of controlling alarm signals comprising the steps of:
   directing a customer alarm signal from a customer to a middleware processor,
   receiving in the middleware processor, the customer alarm signal,
   identifying a customer associated with the customer alarm signal, and
   routing the customer alarm signal based upon identification of the customer associated with the customer alarm signal;

wherein the step of directing a customer alarm signal from a customer to a middleware processor comprises the steps of:
  intercepting an alarm signal at a customer alarm panel, and
  redirecting the alarm signal using a redialer to complete a call to the middleware processor, and
wherein the step of identifying the customer associated with the customer alarm signal comprises the steps of:
  identifying the source of the alarm signal using caller ID to identify a customer phone number,
  looking up the customer phone number on a customer phone number database, and
  identifying the customer associated with the identified customer phone number.

2. The method of claim 1, wherein the step of routing the customer alarm signal based upon identification of the customer associated with the customer alarm signal comprises the steps of:
  determining an alarm monitoring company associated with the customer, and
  directing the alarm signal to the alarm company associated with the customer.

3. The method of claim 2, wherein the step of directing the alarm signal to the alarm company associated with the customer comprises the steps of:
  dialing out to an alarm company using a telephone line, and
  transmitting the customer alarm signal to the alarm company associated with the customer.

4. The method of claim 3, further comprising the step of reformatting the customer alarm signal into a format compatible with the alarm company associated with the customer.

5. The method of claim 4, wherein the step of reformatting the customer alarm signal comprises inserting a new customer account number into the customer alarm signal.

6. The method of claim 2, wherein the step of directing the alarm signal to the alarm company associated with the customer comprises the steps of:
  communicating with the alarm company using a local computer interface, and
  transmitting the customer alarm signal as a Remote Procedure Call (RPC) to the alarm company associated with the customer.

7. The method of claim 6, further comprising the step of reformatting the customer alarm signal into a format compatible with the alarm company associated with the customer.

8. The method of claim 7, wherein the step of reformatting the customer alarm signal comprises inserting a new customer account number into the customer alarm signal.

9. The method of claim 1, wherein the step of routing the customer alarm signal based upon identification of the customer associated with the customer alarm signal comprises the steps of:
  determining an alarm procedure associated with the customer, and
  directing the alarm signal according to the alarm procedure associated with the customer.

10. The method of claim 9, wherein the step of directing the alarm signal according to the alarm procedure associated with the customer comprises the steps of:
  generating a voice message indicating the alarm, and
  transmitting the voice message to the customer.

11. The method of claim 10, wherein the step of transmitting the voice message to the customer comprises the step of transmitting a telephone message to the customer.

12. The method of claim 9, wherein the step of directing the alarm signal according to the alarm procedure associated with the customer comprises the steps of:
  generating a text message indicating the alarm, and
  transmitting the text message to the customer.

13. The method of claim 12, wherein the step of transmitting the text message to the customer comprises the step of transmitting a text message to at least one of a portable phone, cellular phone, digital phone, paging device, mobile e-mail device, mobile text messaging device, and e-mail message.

14. The method of claim 9, wherein the step of directing the alarm signal according to the alarm procedure associated with the customer comprises the step of directing the alarm signal to an alarm monitoring company associated with the customer.

15. The method of claim 9, wherein the step of directing the alarm signal according to the alarm procedure associated with the customer comprises the step of logging the alarm signal into a database in the middleware provider.

16. A system of controlling alarm signals comprising:
  means for directing a customer alarm signal from a customer to a middleware processor; and
  a middleware processor for receiving and processing the customer alarm signal, the middleware processor comprising:
    means for identifying a customer associated with the customer alarm signal, and
    means for routing the customer alarm signal based upon identification of the customer associated with the customer alarm signal;
  wherein said means for directing a customer alarm signal from a customer to a middleware processor comprises a redialer for intercepting an alarm signal at a customer alarm panel and redirecting the alarm signal by completing a call to the middleware processor; and
  wherein said means for identifying the customer associated with the customer alarm signal comprises:
    means for identifying the source of the alarm signal using caller ID to identify a customer phone number;
    means for looking up the customer phone number on a customer phone number database; and
    means for identifying the customer associated with the identified customer phone number.

17. The system of claim 16, wherein said means for routing the customer alarm signal based upon identification of the customer associated with the customer alarm signal comprises:
  means for determining an alarm monitoring company associated with the customer; and
  means for directing the alarm signal to the alarm company associated with the customer.

18. The system of claim 17, wherein said means for directing the alarm signal to the alarm company associated with the customer comprises:
  means for dialing out to an alarm company using a telephone line; and
  means for transmitting the customer alarm signal to the alarm company associated with the customer.

19. The system of claim 18, further comprising means for reformatting the customer alarm signal into a format compatible with the alarm company associated with the customer.

20. The system of claim 19, wherein said means for reformatting the customer alarm signal inserts a new customer account number into the customer alarm signal.

21. The system of claim 17, wherein said means for directing the alarm signal to the alarm company associated with the customer comprises a local computer interface for communicating with the alarm company using a local computer interface by transmitting the customer alarm signal as a Remote Procedure Call (RPC) to the alarm company associated with the customer.

22. The system of claim 21, further comprising means for reformatting the customer alarm signal into a format compatible with the alarm company associated with the customer.

23. The system of claim 22, wherein said means for reformatting the customer alarm signal inserts a new customer account number into the customer alarm signal.

24. The system of claim 16, wherein said means for routing the customer alarm signal based upon identification of the customer associated with the customer alarm signal comprises:
   means for determining an alarm procedure associated with the customer; and
   means for directing the alarm signal according to the alarm procedure associated with the customer.

25. The system of claim 24, wherein said means for directing the alarm signal according to the alarm procedure associated with the customer comprises:
   means for generating a voice message indicating the alarm; and
   means for transmitting the voice message to the customer.

26. The system of claim 25, wherein said means for transmitting the voice message to the customer comprises said means for transmitting a telephone message to the customer.

27. The system of claim 24, wherein said means for directing the alarm signal according to the alarm procedure associated with the customer comprises:
   means for generating a text message indicating the alarm; and
   means for transmitting the text message to the customer.

28. The system of claim 27, wherein said means for transmitting the text message to the customer comprises said means for transmitting a text message to at least one of a portable phone, cellular phone, digital phone, paging device, mobile e-mail device, mobile text messaging device, and e-mail message.

29. The system of claim 24, wherein said means for directing the alarm signal according to the alarm procedure associated with the customer comprises said means for directing the alarm signal to an alarm monitoring company associated with the customer.

30. The system of claim 24, wherein said means for directing the alarm signal according to the alarm procedure associated with the customer comprises said means for logging the alarm signal into a database in the middleware provider.

* * * * *